May 9, 1944. D. E. SELBY 2,348,266
ANGLE TOOL HOLDER
Filed Oct. 28, 1941

INVENTOR.
DWIGHT E. SELBY, DECEASED
BY CHRISTIAN A. ANDRESEN,
EXECUTOR
George B. White
ATTORNEY.

Patented May 9, 1944

2,348,266

UNITED STATES PATENT OFFICE 2,348,266

ANGLE TOOLHOLDER

Dwight E. Selby, deceased, late of Seattle, Wash., by Christian A. Andresen, executor, Seattle, Wash., assignor, by direct and mesne assignments, of one-half to Clifford M. Harbough and Inez Cherry, both of Salem, Oreg., and one-half to Albert P. Peters, San Francisco, Calif.

Application October 28, 1941, Serial No. 416,809

3 Claims. (Cl. 77—31)

This invention relates to angle tool holders, and particularly angle drills.

In many different types of work it is very difficult to hold a tool so that the spindle or the chuck of the tool is in operative position with respect to the part of the work to be cut. The drilling of holes where the body of the portable drill or the spindle or chuck of the usual drill cannot reach is extremely difficult and in many instances it requires a redesigning of structures and multiplies the operations for the finishing of a product or an article.

The primary object of this invention is to provide an attachment which can be easily connected to the usual spindle or chuck of a cutting or drilling machine, for instance to the chuck of a portable drill, and whereby the cutting tool or drill is held at universally adjustable angles with respect to the spindle of the machine.

The advantages of this invention are the flexibility for drilling operations by universal adjustment in various directions so as to perform work at points which would be otherwise inaccessible. Additional advantages are the provision of a tool of very few parts which can be quickly assembled on the usual spindle or chuck and which can be used as a handle for holding a tool at various adjusted angles. A further feature of this invention is that the rotating shanks of the attachment through which rotation is transmitted from the usual spindle of a cutting or drilling machine to the tool are in constant engagement with an efficient transmission within the casing of the attachment.

Another object of this invention is to provide an angle tool holder and angle drill which is highly useful and simple in construction. Convenience of arrangement, lightness and comparative inexpensiveness of manufacture are further objects which have been borne in mind in the production and development of the invention.

In this specification, and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

With the foregoing and other objects in view, which will be made manifest in the following detailed description, reference is had to the accompanying drawing for the illustrative embodiment of the invention, wherein.

Figure 1:
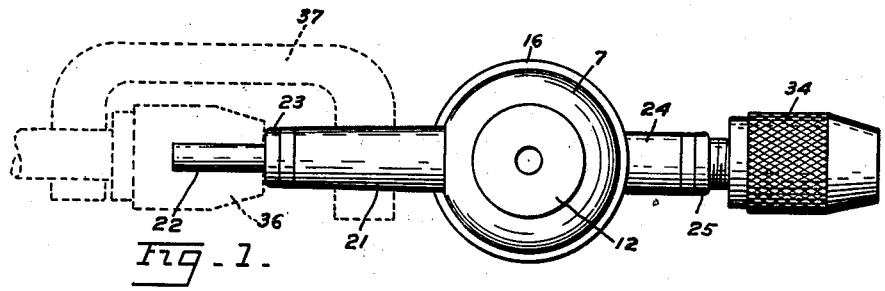
Fig. 1 is a plan view of the tool holder, the engaging parts of a usual drilling machine being shown in broken lines.
Figure 2:
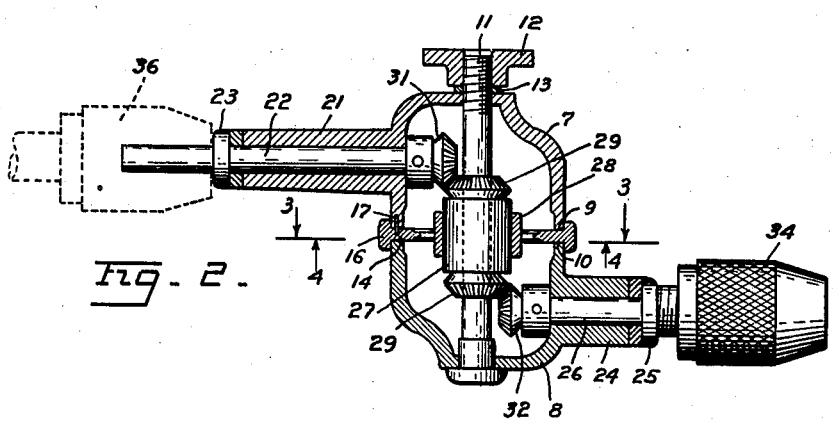
Fig. 2 is a sectional view of the tool holder.
Figure 3:
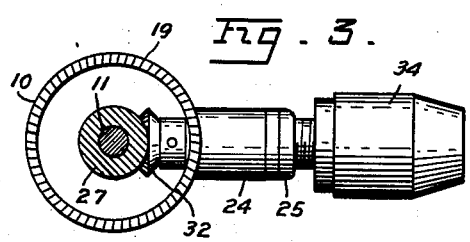
Fig. 3 is a plan view partly in section viewing substantially on the lines 3—3 of Fig. 2.
Figure 4:
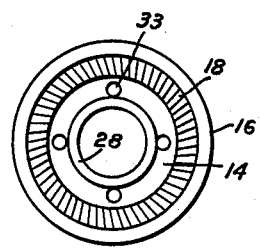
Fig. 4 is a plan view of the connecting disc looking substantially in the direction of the arrows on lines 4—4 of Fig. 2.
Figure 5:
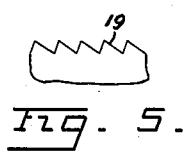
Fig. 5 is a detailed view of the serrations on the disc.

In the illustrative form of the invention a casing is formed by two complemental hollow sections 7 and 8. These sections 7 and 8 are substantially cup-shaped with the rims 9 and 10 thereof facing each other. A bolt 11 extends axially through the sections 7 and 8. The usual head of the bolt 11 bears against the outside of the lower section 8 and a suitable, preferably knurled nut 12 bears against a suitable lock washer 13 and against the outside of the bottom of the other section 7 as the nut 12 is turned on the threaded end of the bolt 11 and tightens the sections 7 and 8 toward each other.

Between the rims 9 and 10 of the casing sections 7 and 8 is provided a flat ring or disc 14 which has an annular ring 16 around its outer periphery. The ring 16 extends beyond both sides of the disc 14. The opposite rims 9 and 10 fit into the ring 16 at the opposite sides of the disc 14 so that the joint is effectively sealed and lateral shifting of the sections 7 and 8 with respect to each other is prevented. A connecting pin 17 extends into an aligning hole in the rim 9 of the section 7 and in the adjacent face of the disc 14 so that when assembled the disc 14 moves with the upper section 7 of the casing. The other face of the disc 14 is provided with an annular set of serrations 18. These serrations 18 are offset and at an angle to the respective radii of the disc. The serrations 18 are all substantially of the same spacing and of the same pitch and dimensions. The rim 10 of the lower section 8 is also provided with a circular set of serrations 19 which are of the same pitch, arrangement and dimensions as the corresponding serrations 18 on the disc. Thus when the nut 12 is loosened so as to allow the disengagement of the lower section 8 from the disc 14 sufficiently to clear the serrations, then the lower section 8 can be turned around bolt 11 as an axis. The section 8 may be fastened again in the adjusted position by drawing up the bolt 11 by the nut 12 so that the serrations 19 are brought into tight engagement with the disc serrations 18. In this manner relative angular adjustments can be accomplished by the sections 7 and 8 around the bolt 11 as an axis.

The upper section 7 has a shank arm 21 extended substantially at right angles to the bolt 11. In this shank arm 21 is journalled a shank 22 which is held against axial movement by suitable collars 23 at the opposite ends of the shank arm 21. The other end of the shank 22 extends outside the shank arm 21 so that it may be engaged in the usual spindle or tool holder on the cutting or drilling machine in connection with which this attachment is used. The other section 8 has a shorter shank arm 24 in which is journalled another shank 26 which later is held against axial movement by suitable collars 25 at the opposite ends of the shorter shank arm 24. Rotation is transmitted from the shank 22 to the shank 26 by a transmission disposed entirely within the closed casing formed by the sections 7 and 8. A sleeve 27 is rotatably positioned on the bolt 11 and is journalled in bearing 28 in the center of the disc 14. The sleeve 27 has a bevel gear 29 at each end thereof. The bevel gears 29 and the sleeve 27 form a unit which is slidable as well as rotatable on the bolt 11. The shank 22 has a bevel gear 31 on its inner end. This bevel gear 31 is in constant mesh with the adjacent bevel gear 29. The central shank 26 has a bevel gear 32 on its end which is in constant mesh with the other bevel gear 29 on the sleeve 27. When the shank 22 is rotated it transmits rotation through the bevel gears 29 and sleeve 27 to the bevel gear 32 and the shank 26. It is to be also noted that if the whole casing is turned or adjusted around the shank 22 as an axis then the bevel gears 31 and 29 ride on each other and remain in constant mesh at all angular positions. When the other section 8 is loosened and angularly adjusted around the bolt 11 as an axis then the bevel gear 32 rides on the adjacent bevel gear 29 and remains in constant mesh in all adjusted positions. Normally it is not necessary to lower the section 8 sufficiently far to disengage the bevel gear 32 from the adjacent bevel gear 29.

It is to be noted that when the unit is assembled then the casing is completely closed and it can be filled with suitable grease. To allow compensation of the grease packing between the cavities of the two sections 7 and 8 the disc 14 is provided with communicating holes 32. The shorter shank 26 is adapted to hold a drill or tool. For this purpose a usual self-centering chuck 34 is provided on the outer end of the shank 26. This chuck 34 engages and holds a drill or a rotating tool.

In operation the angle attachment or holder is connected to the usual spindle or chuck of a drilling machine by the engagement of the outer end of the shank 22 with a spindle or chuck of such machine. As shown herein the outer end of the shank 22 is held in the usual chuck 36 of such machine (the machine is not shown), and in addition the shank arm 21 of the casing may be also held in a suitable bracket 37 on said machine as shown in broken lines Figure 1. The desired tool or drill can be easily clamped in the chuck 34 of the outer shank 26. As the attachment is connected to a cutting or drilling machine, such a portable drill, universal adjustments around the bolt 11 as an axis and around the shank 22 as another axis can be easily accomplished and thus the drill can be held at various suitable angles relatively to the axis of the rotating spindle of the machine, as needed to reach the desired location in the work. The outer contour of the casing formed by the sections 7 and 8 is such as to provide a convenient hand grip so that the attachment can be held in the hand by gripping and holding the casing at a desired angle. The adjustment around the bolt 11 as an axis is held by tightening the nut 12. The adjustment around the shank 22 as an axis is held by the grip of the operator at the desired angle.

It will be recognized that a particularly facile device is provided to facilitate drilling at various otherwise inaccessible angles; the device combines light weight and compactness with ruggedness of construction and positiveness of operation especially adapting it for its use. Being of unitary character the device requires no careful setting up and lends itself to effective application by the labor ordinarily available.

What is claimed is:

1. In an angle tool holder, a pair of hollow sections complementing each other to form a closed casing, a partition disc between and engaged with the adjacent ends of said sections, releasable connecting means between at least one of said sections and said disc to allow the rotary adjustment of said section relatively to the disc and the other section, and to hold said adjusted section in adjusted position when said sections are tightly held together, means to hold said sections together and against said disc, said holding means being adapted to loosen said adjustable section for angular adjustment, a shank extended through each section, a transmission in the casing journaled in said disc and connected to said shanks so as to allow the angular adjustment of said sections, one of said shanks being adapted for connection to a rotating spindle of a machine, and means on the other shank to hold a tool in operative position on the latter shank.

2. In an angle tool holder the combination with a casing made of relatively adjustable sections and having a shank extended through each section substantially at right angles to the axis of the casing; of an element extended substantially axially through the casing, means on said element engaging the respective ends of said sections to hold said sections together, a sleeve rotatable on said element, a partition between said sections, said sleeve being rotatable in said partition, a bevel gear on each end of the sleeve, and a bevel gear on the inner end of each shank in constant mesh with the respective bevel gears of said sleeve so as to transmit rotation from one shank to the other shank, said meshing bevel gears riding on one another during relative adjustments of said sections.

3. An angle drill holder comprising, a pair of complemental hollow casing sections, a bolt extended axially through said sections so as to hold the sections together to form a casing, a disc between the meeting ends of the sections, means to connect one section for movement with the disc, complemental serrations on a face of the disc and on the open rim of the other section for engagement in all angular positions, means on the bolt to releasably tighten said sections against the disc, an enlarged rim on the disc overlapping the outside of the rim of both sections so as to seal the joining edges of said sections, a shank arm extended from each casing section, said shank arms being in substantially parallel planes, a shank rotatably held in each shank arm, a transmission sleeve rotatably positioned on the bolt and journalled in said disc, a bevel gear at each end of the sleeve in operative relation to the end of the adjacent shank, a bevel gear on each shank in mesh with the respective gears of the transmission so that said shank bevel gears can engage the respective sleeve bevel gears when said sections are relatively adjusted, and a chuck for holding a tool on the outside end of one of said shanks, the other shank being adapted for connection to the usual rotating spindle of a drilling machine.

CHRISTIAN A. ANDRESEN,
Executor of the Estate of Dwight E. Selby, Deceased.